Jan. 10, 1928.
C. J. BAILEY
1,655,887
PROTRACTOR
Filed Dec. 3, 1924
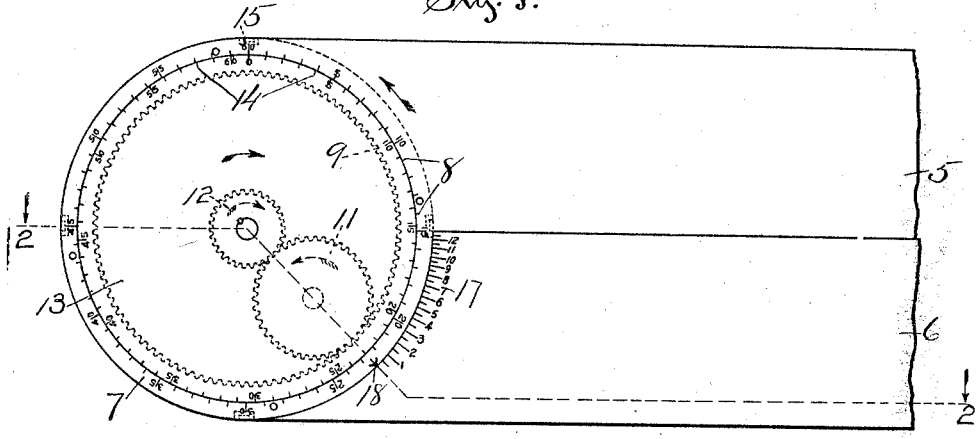
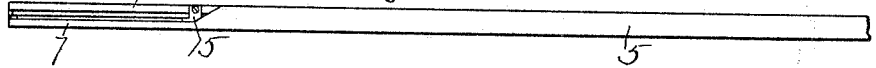
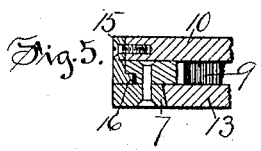
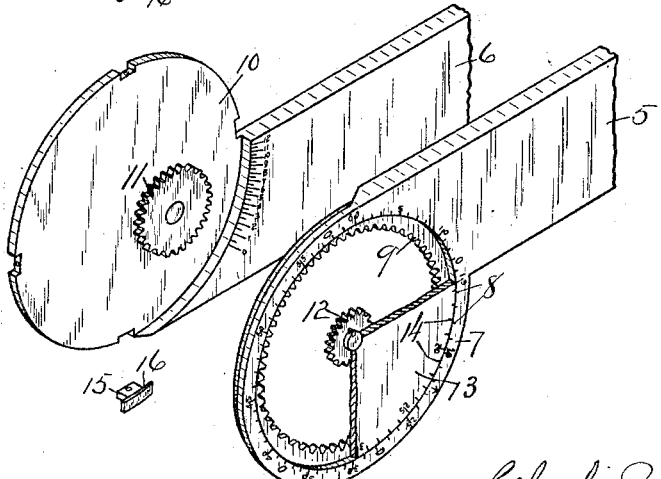
INVENTOR
Charles Jerome Bailey,
by
Arthur Jenkins
ATTORNEY Patented Jan. 10, 1928.

1,655,887

UNITED STATES PATENT OFFICE.

CHARLES JEROME BAILEY, OF WATERBURY, CONNECTICUT.

PROTRACTOR.

Application filed December 3, 1924. Serial No. 753,706.

My invention relates to the class of devices for determining relative angles as to one surface or element with respect to another, and an object of my invention, among others, is the production of a protractor by means of which minute measurements may be obtained with little difficulty, such measurements being read directly upon the instrument.

One form of device embodying my invention and in the construction and use of which the objects herein set out, as well as others, may be attained, is illustrated in the accompanying drawings, in which—

Figure 1 is a face view of the operative portion of my improved protractor.

Figure 2 is a view in section upon a plane denoted by the dotted line 2—2 of Figure 1.

Figure 3 is an edge view of the device.

Figure 4 is a disjointed view illustrating the several parts of the device in relative positions for assembling.

Figure 5 is a detail view on enlarged scale of a fragment of the device illustrating the manner of connecting the parts.

A protractor embodying my invention, and as disclosed herein, embodies means whereby angles existing to fractions of degrees may be readily determined the device herein illustrated enabling such angles in terms of minutes to be ascertained, in such drawings the numeral 5 denoting a degree blade, in that graduations thereon are employed to ascertain angles in terms of degrees, and the numeral 6 indicates an opposing blade that, by opposing movement of the degree blade, causes graduations hereinafter referred to, to denote the relative angular positions of the two blades in terms of minutes. A degree member in the form of a ring 7 is made preferably integral with the blade 5 at one end thereof, such ring being provided with degree graduations 8 extending in a row around it and comprising marks denoting degrees numbered from one to sixty. A gear ring 9 forms a rigid part of the degree ring, as shown herein this gear ring being preferably formed separately from the degree ring and secured thereto in any suitable manner.

The opposing blade 6 has a supporting plate 10 preferably formed integral therewith at one end and having a stud rotatably supporting a gear 11, and as shown in Figure 4 of the drawings. This gear meshes with teeth formed on the inner edge of the gear ring 9, thereby constituting an internal gear, and said gear 11 also meshes with a pinion 12 secured to a minute plate 13, this plate having displayed thereon graduations 14 by means of which fractions of degrees in terms of minutes may be determined. The plate 13 fits nicely within an opening in the ring 7 so that such plate may be rotated freely with such ring as a bearing therefor. The plate 13 may be retained in place in any suitable manner, as by means of engaged beveled edges on the ring and plate. The ring 9 and plates 10 and 13 constitute a housing for the gear mechanism.

Clips 15 (see Figure 4) are secured in notches in the edge of the plate 10 and have lips 16 extending into a groove 17 formed by the rings 7 and 9 and extending therearound, these clips comprising means for securing the blades 5 and 6 together to maintain them in cooperative position.

It will be noted that the graduations on scale 14 on the plate 13 are spaced one-sixtieth of the interval between the degree graduations nearer each other than are such degree graduations 8 on the ring 7, that is, the graduations 14 are 1/60th nearer than are the graduations 8. The intermeshing gear elements are so relatively timed that when the blades 5 and 6 are separated to an angle represented by fractions of degrees, any such fraction of a degree in terms of minutes will be denoted by that graduation on scale 14 that registers with a graduation on scale 8. As an example, if the blades 5 and 6 be separated so that the zero graduation on scale 14 registers with the first graduation on scale 8 to the right of the graduation numbered 60 in Figure 1, this will indicate that the blades are located at an angle of one degree with respect to each other. If the blades be separated slightly more than this, so that the first graduation on scale 14 to the right of the zero graduation in Figure 1 registers with the second graduation on scale 8 to the right of the graduation 60, this will indicate that the blades are separated to an angle of one degree and one minute. Similarly, if the blades 5 and 6 be separated so that they are located at a forty-five degree angle each to the other, the zero graduation on scale 14 will register with the graduation on scale 8 bearing the numeral 45, and then, if the blades be separated slightly more than this, and so that the graduation on scale 14 bearing the numeral 10 registers with a graduation on scale 8 this will indicate that the blades have been separated to an angle of forty-five degrees and ten minutes, one with respect to another.

It should be noted in this connection that when the blades are separated, as by moving the blade 5 in the direction indicated by the arrow in Figure 1, the plate 13 will be rotated in the direction indicated by the arrow thereon and that the rate of movement of the plate is much faster or greater than the separating movement of the blades.

A scale 17 on the blade 6 is provided for the purpose of determining the degree of pitch of a surface with respect to its base, or, in other words, the amount of "rise" of a surface per unit of length on the base, in the device shown the graduations denoting the rise in inches per running base foot. For instance, if the blade 5 be separated from the blade 6 so that the arrow 18 registers with the numeral 1 in said table, this will denote the angle of the blades one with respect to the other, and representing a rise of one inch per running foot of the base.

In accordance with the provisions of the patent statutes I have described the principles of operation of my invention, together with the device which I now consider to represent the best embodiment thereof, but I desire to have it understood that the device shown is only illustrative and that the invention may be carried out by other means and applied to uses other than those above set out.

I claim—

1. A protractor comprising two blades pivotally connected, one of said blades having a ring formed thereon, a toothed ring secured to said first mentioned ring, a plate on the other blade underlying and closing one side of said first-mentioned ring, another plate having a bearing within the other side of said first-mentioned ring and upon said toothed ring, there being cooperating graduations upon said plate and ring, and a geared connection between said plate and ring.

2. A protractor comprising two blades pivotally connected, one of said blades having a ring at its pivoted end with a toothed ring rigidly secured thereto and the other blade having a plate underlying said first-mentioned ring and closing one side thereof, a pinion pivotally supported by said underlying plate and in mesh with the teeth of said ring, a plate rotatably mounted within said ring to close the opening on one side thereof, and a pinion secured to said last mentioned plate and in mesh with the first mentioned pinion, and there being cooperating graduations on said plate and ring.

3. A protractor comprising two blades pivotally connected, one of said blades having a ring formed thereon with teeth on the inner edge thereof, a plate on the other blade underlying and closing one side of said ring, another plate located on the other side of said ring and closing the opening thereinto, there being cooperating graduations upon said last mentioned plate and ring, and a geared connection between said plate and ring.

CHARLES JEROME BAILEY.